United States Patent
Park et al.

(10) Patent No.: US 7,037,063 B2
(45) Date of Patent: May 2, 2006

(54) SUBSTRATE FLOATING APPARATUS AND METHOD OF MANUFACTURING LIQUID CRYSTAL DISPLAY APPARATUS USING THE SAME

(75) Inventors: Yong-Seok Park, Seoul (KR); Sang-Ho Kim, Hwasong (KR); Han-beom Jo, Euiwang (KR)

(73) Assignee: Display Manufacturing Services Co., Ltd., Suwon (KR)

( * ) Notice: Subject to any disclaimer, the term of this patent is extended or adjusted under 35 U.S.C. 154(b) by 63 days.

(21) Appl. No.: 10/404,447

(22) Filed: Apr. 2, 2003

(65) Prior Publication Data

US 2003/0196605 A1    Oct. 23, 2003

(30) Foreign Application Priority Data

Apr. 18, 2002 (KR) .................. 10-2002-0021189
Apr. 23, 2002 (KR) .................. 10-2002-0022206

(51) Int. Cl.
*B65G 35/00*  (2006.01)
(52) U.S. Cl. ......................... 414/676; 406/88
(58) Field of Classification Search ................. 406/88, 406/89; 414/676; 219/648
See application file for complete search history.

(56) References Cited

U.S. PATENT DOCUMENTS

| | | | | |
|---|---|---|---|---|
| 3,865,254 A | * | 2/1975 | Johannsmeier | 414/676 |
| 4,219,110 A | * | 8/1980 | Ubukata | 198/380 |
| 4,456,406 A | * | 6/1984 | Lenhart | 406/88 |
| 4,776,745 A | * | 10/1988 | Foley | 414/217 |
| 5,194,406 A | * | 3/1993 | Bok et al. | 438/704 |
| 5,466,096 A | * | 11/1995 | Hilbish et al. | 406/84 |
| 5,634,636 A | * | 6/1997 | Jackson et al. | 271/225 |
| 5,788,425 A | * | 8/1998 | Skow et al. | 406/88 |
| 6,193,507 B1 | * | 2/2001 | White et al. | 432/247 |
| 6,336,775 B1 | * | 1/2002 | Morita et al. | 406/88 |
| 6,394,733 B1 | * | 5/2002 | Toda et al. | 414/221 |
| 6,398,823 B1 | * | 6/2002 | Siniaguine et al. | 29/25.01 |
| 6,447,217 B1 | * | 9/2002 | Toda et al. | 406/88 |
| 6,461,085 B1 | * | 10/2002 | Adam et al. | 406/62 |
| 6,494,646 B1 | * | 12/2002 | Sala | 406/88 |
| 6,676,365 B1 | * | 1/2004 | Adam et al. | 406/83 |
| 6,969,224 B1 | * | 11/2005 | Miyachi et al. | 414/676 |

\* cited by examiner

*Primary Examiner*—Douglas Hess
(74) *Attorney, Agent, or Firm*—Rothwell Figg Ernst & Manbeck

(57) ABSTRACT

There are provided a substrate floating apparatus for preventing interference between a glass substrate and a floating board when floating and conveying the glass substrate and a method of manufacturing LCD devices using the substrate floating apparatus. The substrate floating apparatus includes a body into which floating fluid is supplied and which stores the floating fluid, a floating board that is placed on the top of the body and through which the floating fluid is sprayed to float the substrate to the predetermined height, and a fixing member that mechanically fixes the floating board on the top of the body. A certain process is performed while floating the substrate.

2 Claims, 9 Drawing Sheets

SUBSTRATE FLOATING APPARATUS AND METHOD OF MANUFACTURING LIQUID CRYSTAL DISPLAY APPARATUS USING THE SAME

BACKGROUND OF THE INVENTION

This application claims the priority of Korean Patent Application No. 2002-21189, filed on Apr. 18, 2002, and Korean Patent Application No. 2002-22206, filed on Apr. 23, 2002, in the Korean Intellectual Property Office, the disclosures of which are incorporated herein in their entirety by reference.

FIELD OF THE INVENTION

The present invention relates to an apparatus and method for manufacturing liquid crystal display (LCD) devices, and more particularly, to a substrate floating apparatus and method of manufacturing LCD devices using the substrate floating apparatus.

DESCRIPTION OF THE RELATED ART

Generally, a glass substrate for an LCD device is loaded on a conveying apparatus including rollers and subject to a certain process, such as a cleaning process. The conveying apparatus includes a plurality of conveying rollers for conveying the glass substrate and a driving roller for driving the conveying rollers. The glass substrate is conveyed owing to the rolling friction with the conveying rollers.

However, since the conveying rollers are placed at constant intervals and due to the weight of the substrate, the portions of the substrate which are not supported by the conveying rollers could be sunk (lowered), during the conveyance. Further, since cleaning or etching fluid is sprayed with a certain force during the cleaning or etching process, the other side of the substrate relatively raised during the conveyance can be damaged.

In order to prevent the sinking or the damage of the glass substrate, a substrate floating apparatus as shown in FIG. 1 has been used in a conventional conveying apparatus. Referring to FIG. 1, a conventional substrate floating apparatus 100 includes a body 110 for storing floating fluid supplied thereinto and a floating board 120 placed on the top of the body 110, which floats the substrate by spraying the floating fluid.

The body 110 includes a fluid inlet 112 through which the fluid is supplied from the outside and a tank 114 for storing the fluid supplied through the fluid inlet 112. The floating board 120 is adhered on the top of the body 110 using an adhesive. The substrate is substantially floated and conveyed by the pressure of the floating fluid within the tank 114 and the pressure of the fluid sprayed via the floating board 120.

Since the floating board 120 is adhered to the body using an adhesive, the adhesive strength can be diminished through high temperature and high pressure processes or as the processes are performed for a long time. If the adhesive strength between the floating board 120 and the body 110 is weakened, the floating board 120 is occasionally separated from the body 110 and interferes with the conveyed glass substrate. Accordingly, the glass substrate can be damaged and the production yields of LCD devices can be greatly lowered.

Meanwhile, LCD manufacturing processes include not only the processes performed while conveying the substrates but also processes performed while supporting the substrates at fixed positions. In the latter case, it is important to perform the processes while supporting the substrates at accurate positions to prevent damages of the substrates.

FIGS. 2 to 4 are schematic diagrams of a conventional substrate supporting apparatus for LCD manufacturing equipment, which supports a substrate, such as a thin film transistor (TFT) substrate, a color filter (CF) substrate, or an assembly of the TFT and the CF substrates, during processes for, e.g., attaching the TFT and the CF substrates with each other, coating an alignment film, or attaching a polarizer. FIG. 2 is a perspective view, FIG. 3 is a plane view, and FIG. 4 is a front view of the conventional substrate supporting apparatus. Particularly, FIG. 4 shows an assembly of TFT and CF substrates together with the substrate supporting apparatus to illustrate a state where a process is performed.

As shown in FIGS. 2 and 3, the conventional substrate supporting apparatus includes a platform 150 and a plurality of supporting members 154 orderly attached on the platform 150. The supporting members 154 have shapes of thin and long rods. The ends of the supporting members 150 are shaped such that the areas contacting the substrate are minimized to cause no defects in the substrate and to facilitate an adjustment of a position of the substrate.

A method of manufacturing LCD devices using the conventional substrate supporting apparatus will now be briefly described with reference to FIG. 4. In a case of performing a cell process or other processes of a substrate, an assembly of TFT and CF substrates is put on the supporting members 150 and the required process is performed. Since the weight of the substrate assembly is concentrated on the upper sections of the supporting members 150, the surface of the TFT substrate contacting the supporting members 150 is likely to be scratched. Further, if any pressure is applied to the substrate assembly from the above, the likelihood of the scratching increases.

In addition, since the ends of the supporting members contact the surface of the substrate assembly, it is difficult to adjust the position of the substrate assembly due to the frictional forces at the contacting points. Further, the likelihood of the scratching increases during the course of adjusting the position.

SUMMARY OF THE INVENTION

The present invention provides an apparatus for floating a substrate, which prevents interference between a floating board and a conveyed substrate and in which the floating board is not separated from the body of a conveying apparatus despite of high temperature and high pressure for a long time.

Further, the present invention provides a method of manufacturing LCD devices using a substrate floating apparatus that can prevent a substrate from being scratched and partially sunk and in which a position of a substrate can be easily adjusted.

According to an aspect of the present invention, there is provided an apparatus for floating a substrate by a predetermined height, which includes a body into which floating fluid is supplied and which stores the floating fluid; a floating board that is placed on the top of the body and through which the floating fluid is sprayed to float the substrate to the predetermined height; and a fixing member that mechanically fixes the floating board on the top of the body.

Preferably, the floating board includes a groove at the outer circumference thereof and the fixing member includes a cover that is placed to enclose the outer circumference of the floating board and which has a protrusion fixedly inserted into the groove, and a connecting member for connecting the cover with the body.

Preferably, the fixing member is the connecting member for connecting the cover with the body and is provided at one or more positions of the periphery of the body. Further, it is preferable that the connecting member is a bolt.

According to another aspect of the present invention, there is provided an apparatus for floating a substrate by a predetermined height, which includes a body into which floating fluid is supplied and which stores the floating fluid; a floating board placed on the top of the body, through which the floating fluid is sprayed to float the substrate to the predetermined height and which has a groove at the outer circumference thereof; a cover that is placed to have the same plane with the surface of the floating board and to enclose the outer circumference of the floating board and which has a protrusion fixedly inserted into the groove; and a connecting member that is provided at one or more positions of the periphery of the body and which connects the body with the cover.

According to another aspect of the present invention, there is provided an apparatus for floating a substrate by a predetermined height, which includes a body into which floating fluid is supplied and which stores the floating fluid; a floating board placed on the top of the body, through which the floating fluid is sprayed to float the substrate to the predetermined height and which has a groove at the outer circumference thereof; a cover that is placed to have the same plane with the surface of the floating board and to enclose the outer circumference of the floating board and which has a supporting projection for supporting the floating board while pressing and bending the periphery of the floating board; and a connecting member that is provided at one or more positions of the periphery of the body and which connects the body with the cover.

According to another aspect of the present invention, there is provided an apparatus for floating a substrate by a predetermined height, which includes a body into which floating fluid is supplied and which stores the floating fluid; a floating board placed on the top of the body, through which the floating fluid is sprayed to float the substrate to the predetermined height; and a connecting member that is provided at one or more positions of the periphery of the body and which connects the body with the cover.

According to another aspect of the present invention, there is provided a method of manufacturing liquid crystal display (LCD) devices, which includes the steps of loading a substrate to place the substrate on the top of a substrate floating apparatus; floating the substrate by a predetermined height by spraying fluid from the substrate floating apparatus to the substrate; and performing a predetermined process for the floated substrate.

Preferably, in the step of loading a substrate, the fluid is sprayed through a floating board of the substrate floating apparatus, which is comprised of a porous plate. Further, it is preferable that the floating board is mechanically fixed to the substrate floating apparatus. In addition, it is preferable that two or more floating boards are mechanically fixed to the substrate floating apparatus at a constant interval.

Preferably, the method further includes an adjustment of the position of the floated substrate before the predetermined process is performed.

BRIEF DESCRIPTION OF THE DRAWINGS

The above and other aspects and advantages of the present invention will become more apparent by describing preferred embodiments thereof with reference to the attached drawings in which.

DETAILED DESCRIPTION OF THE INVENTION

Figure 1:
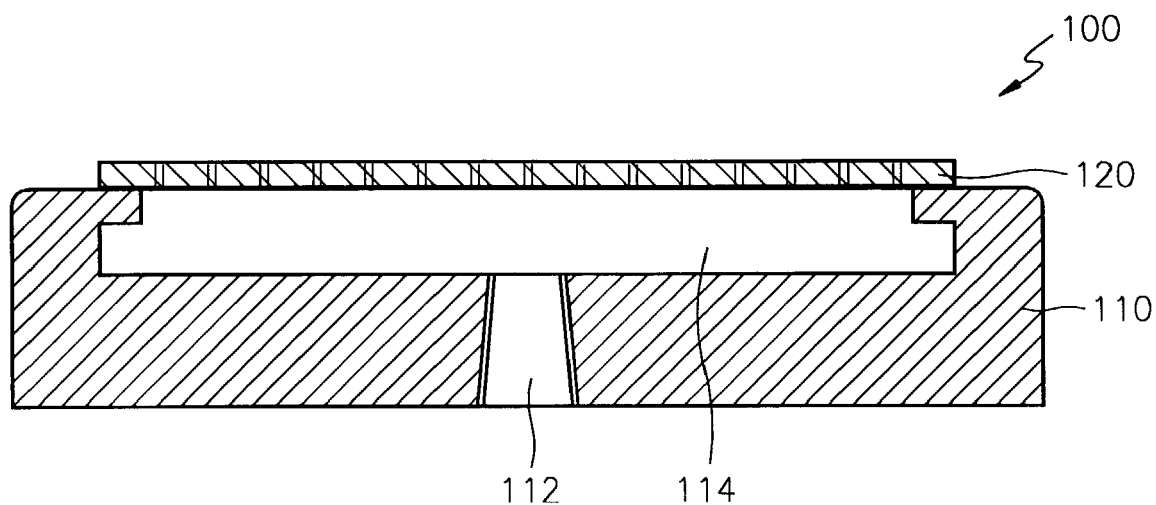
FIG. 1 is a cross-sectional view of a conventional substrate floating apparatus.
Figure 2:
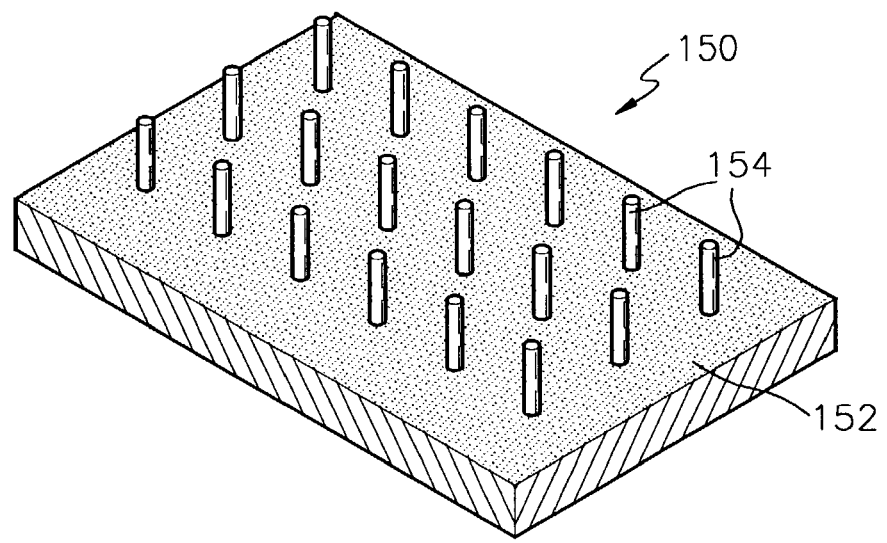
FIG. 2 is a perspective of a conventional substrate supporting apparatus for LCD manufacturing equipment.
Figure 3:
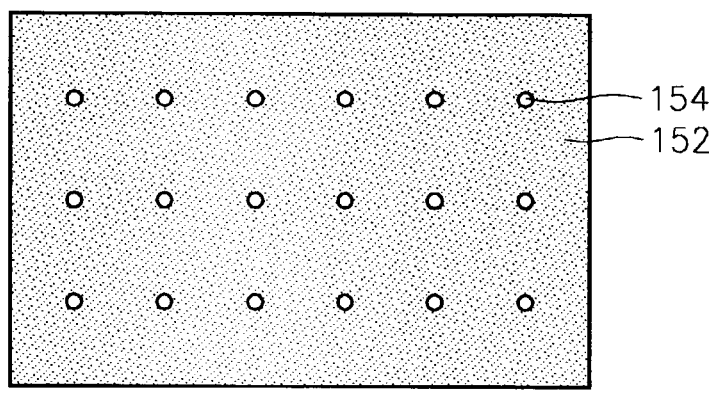
FIG. 3 is a plane view of FIG. 2.
Figure 4:
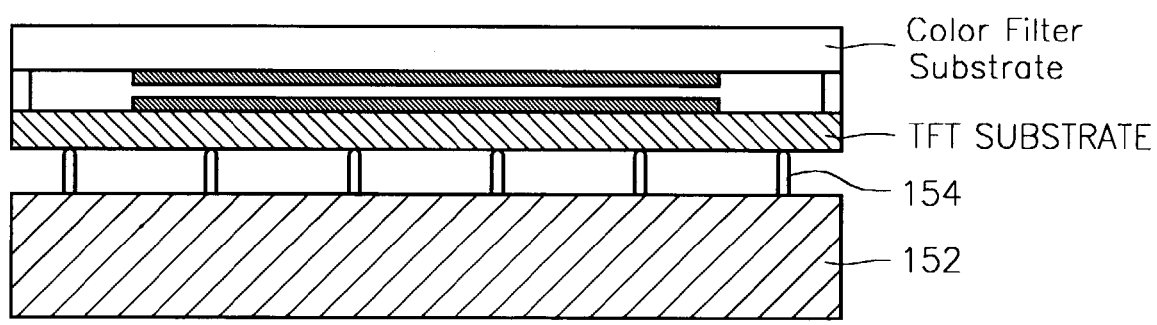
FIG. 4 is a front view of FIG. 2, where an assembly of TFT and CF substrates together with the substrate supporting apparatus are shown.

The present invention will be described more fully hereinafter with reference to the accompanying drawings in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the forms of elements are exaggerated for clarity. To facilitate understanding, identical reference numerals have been used, where possible, to designate identical elements that are common to the figures.

Embodiment 1

Figure 5:
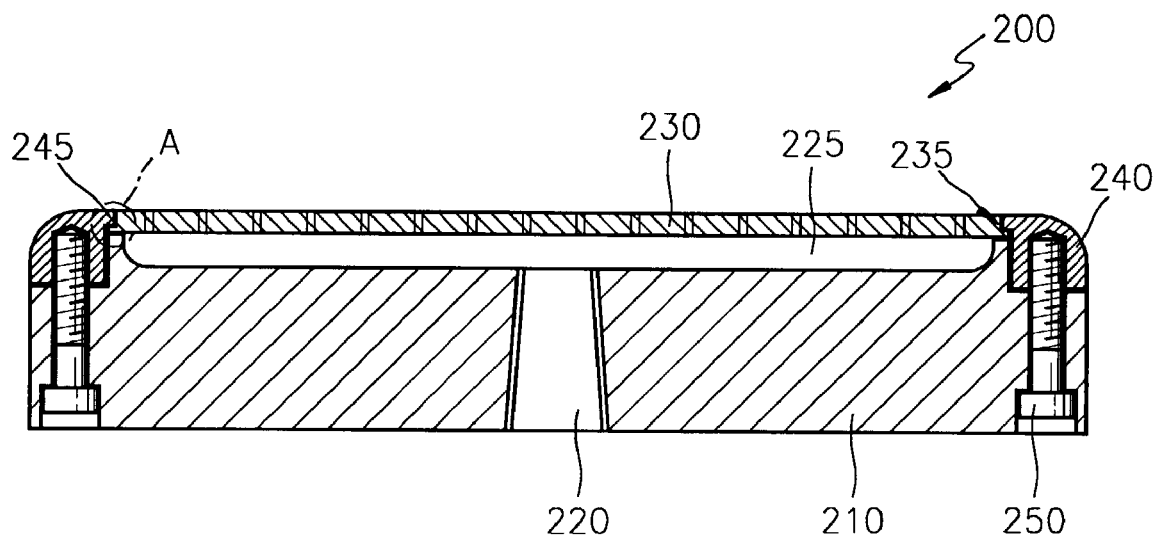
FIG. 5 is a cross-sectional view of a substrate floating apparatus according to a first embodiment of the present invention.
Figure 6:
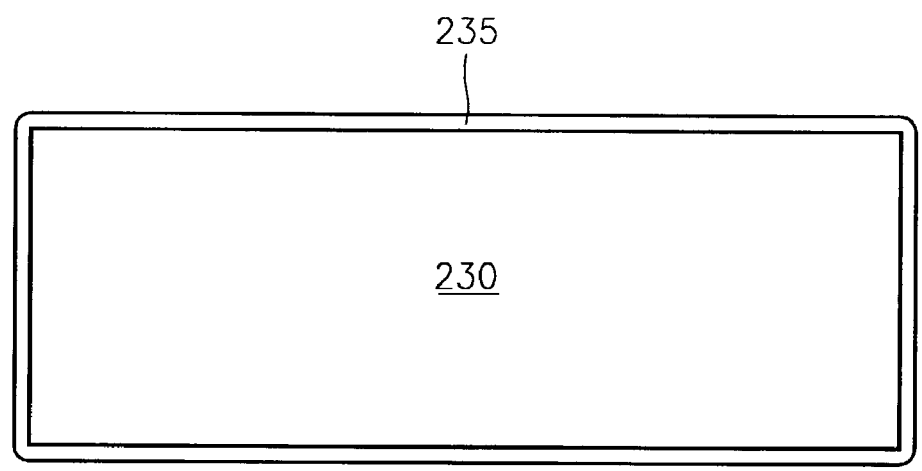
FIG. 6 is a plan view of FIG. 5.
Figure 7:
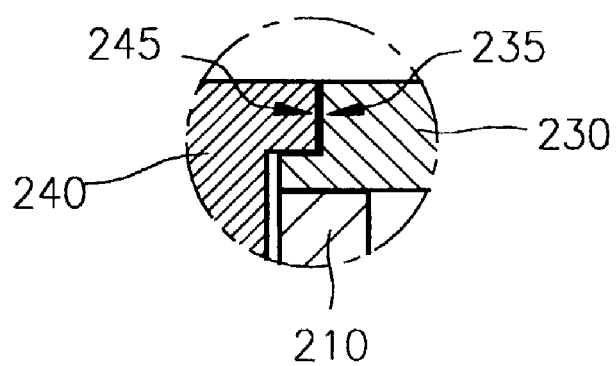
FIG. 7 is a partially enlarged cross-sectional view of the part "A" in FIG. 5.

FIG. 5 is a cross-sectional view of a substrate floating apparatus according to a first embodiment of the present invention. FIG. 6 is a plan view of FIG. 5 and FIG. 7 is a partially enlarged cross-sectional view of the part "A" in FIG. 5.

Referring to FIG. 5, the substrate floating apparatus 200 according to the first embodiment of the present invention includes a body 210 into which floating fluid is supplied and which stores the floating fluid and a floating board 230 placed on the top of the body 210, through which the floating fluid is sprayed to float a glass substrate by a predetermined height. In addition, the substrate floating apparatus 200 includes a cover 240 for mechanically fixing the floating board 230 to the body 210 and a connecting member 250 for connecting the cover 240 with the body 210.

The body 210 includes a fluid inlet 220 provided at the bottom of the body 210, through which the floating fluid is supplied, and a tank 225 connected with the fluid inlet 220, which stores the floating fluid supplied through the fluid inlet 220. Here, the floating fluid may be CDA, deionized water, etc. The fluid inlet 220 and the tank 225 are connected with each other so that the floating fluid can be supplied to the tank 225.

The floating board 230 is mechanically fixed on the top of the body 210. Specifically, as shown in FIGS. 6 and 7, the floating board 230 has a groove 235 with a predetermined depth at the periphery thereof and the cover 240 has a protrusion 245 that is fixedly inserted into the groove 235 of the cover 240. Since the protrusion 245 of the cover 240 is fixed in the groove 235 of the cover 240, the floating board 230 is not projected beyond the surface of the body 210. That is, the floating board 230 is placed on the same plane with the cover 240. The floating board 240 is a porous plate so that the floating fluid can be sprayed through the openings of the floating board 240 and the glass substrate (not shown) can be floated owing to the spraying force, i.e., the pressure of the floating fluid.

The cover 240 and the body 210 are connected with each other using a connecting member 250 like a bolt. Here, the tank 225 is placed with a predetermined space from the side end of the body 210 and the connecting member 250 is provided at one or more positions in the space between the tank 225 and the body 210.

When floating fluid is supplied through the fluid inlet 220, the floating fluid is collected in the tank 225. According to the quantity and pressure of the floating fluid within the tank 225, a glass substrate (not shown) placed on the top of the floating board 230 is floated by a certain height. Since the floating board 230 is mechanically fixed on the body 210 via the cover 240 and the connecting member 250 without using adhesives, it is possible to prevent a separation of the floating board 230 from the body 210 despite of performing a high pressure process for a long time. Accordingly, it is possible to prevent a conventional interference problem between a separated floating board and a conveyed substrate and, therefore, the production yields of display devices are enhanced.

Embodiment 2

Figure 8:
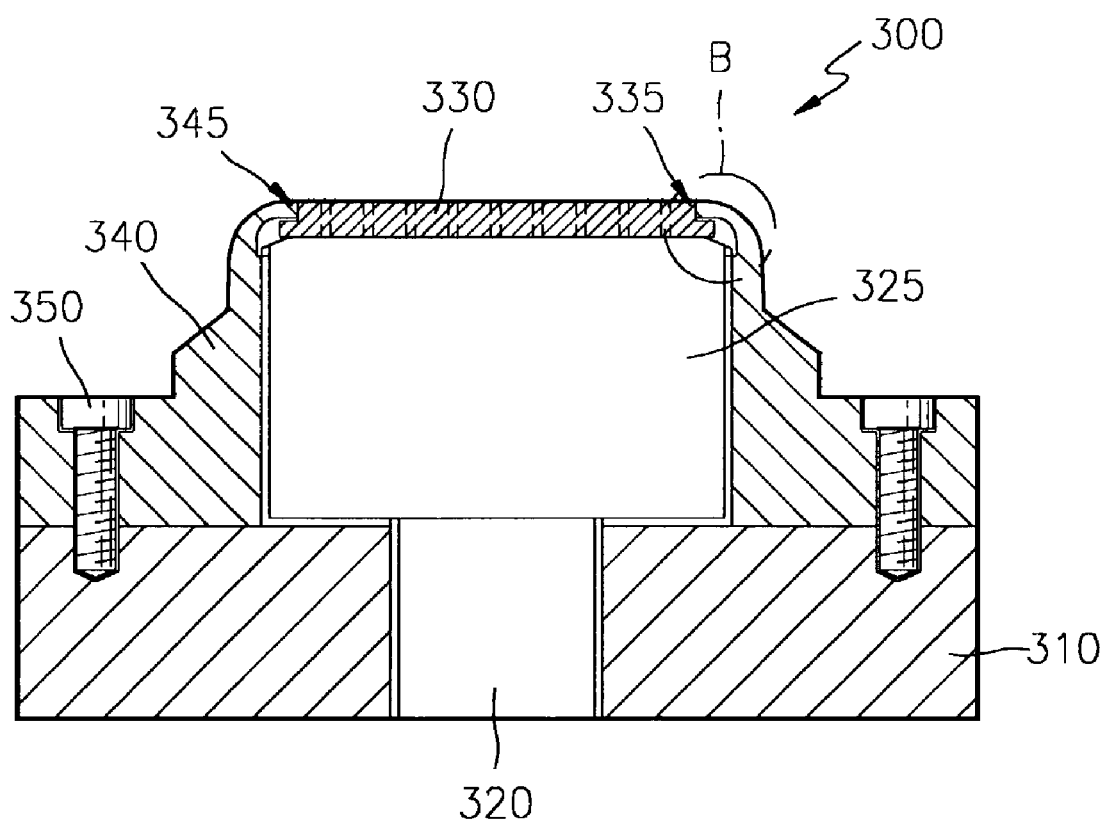
FIG. 8 is a cross-sectional view of a substrate floating apparatus according to a second embodiment of the present invention.
Figure 9:
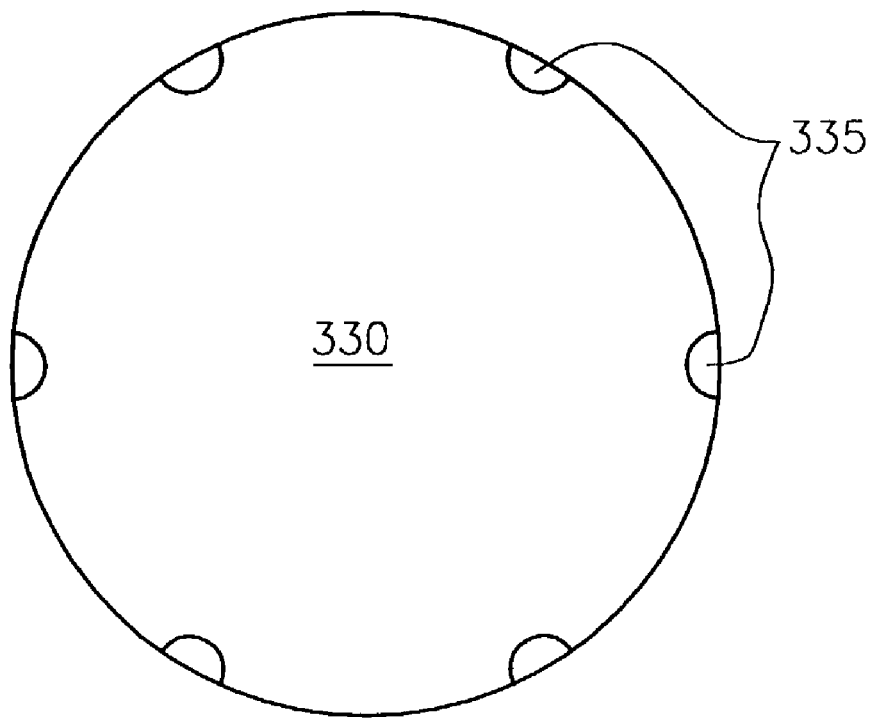
FIG. 9 is a plan view of FIG. 8.
Figure 10:
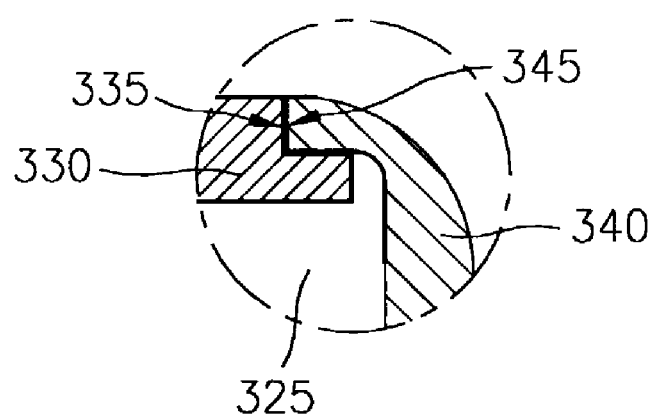
FIG. 10 is a partially enlarged cross-sectional view of the part "B" in FIG. 8.

FIG. 8 is a cross-sectional view of a substrate floating apparatus according to a second embodiment of the present invention. FIG. 9 is a plane of FIG. 8 and FIG. 10 is a partially enlarged cross-sectional view of the part "B" in FIG. 8.

Referring to FIG. 8, the substrate floating apparatus 300 according to the second embodiment of the present invention includes a body 310 into which floating fluid is supplied and which stores the floating fluid and a floating board 330 placed on the top of the body 210, through which the floating fluid is sprayed to float a glass substrate by a predetermined height. In addition, the substrate floating apparatus 300 includes a cover 340 for mechanically fixing the floating board 330 to the body 310 and a connecting member 350 for connecting the cover 340 with the body 310.

The body 310 includes a fluid inlet 320 provided at the bottom of the body 310, through which the floating fluid is supplied, and a tank 325 connected with the fluid inlet 320, which stores the floating fluid supplied through the fluid inlet 320. The inside shape of the body 310 can be freely changed. Here, the floating fluid may be CDA, deionized water, etc.

The floating board 330 is mechanically fixed on the top of the body 310. Specifically, as shown in FIGS. 9 and 10, the floating board 330 has grooves 335 with predetermined spaces at the periphery thereof and the cover 340 has protrusions 345 with predetermined spaces, which are fixedly inserted into the grooves 335 of the cover 340. That is, the cover 340 is formed to enclose the floating board 330 and the body, and more preferably, the outer circumference of the tank 325, and the protrusions 345 of the cover 340 are fixedly inserted in the grooves formed at the outer circumference of the floating board 330. Further, the cross-section of the cover 340 can have a shape similar to a right-angled triangle.

The cover 340 and the body 310 are connected with each other using a connecting member 350 like a bolt. The connecting member 350 is provided at one or more positions in the peripheral area of the body.

The second embodiment also provides the advantageous effects described above with reference to the first embodiment.

Embodiment 3

Figure 11:
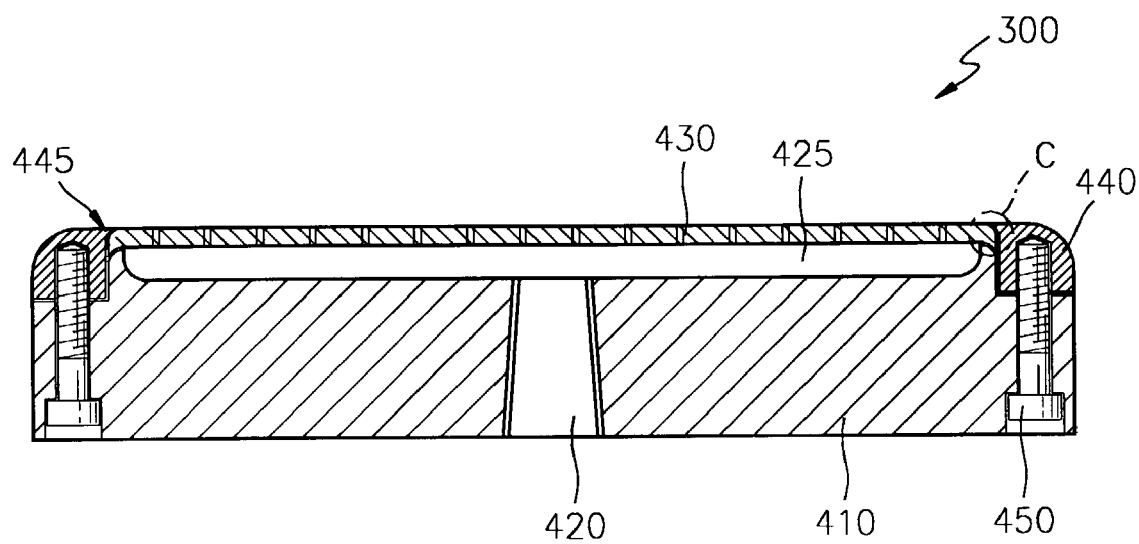
FIG. 11 is a cross-sectional view of a substrate floating apparatus according to a third embodiment of the present invention.
Figure 12:
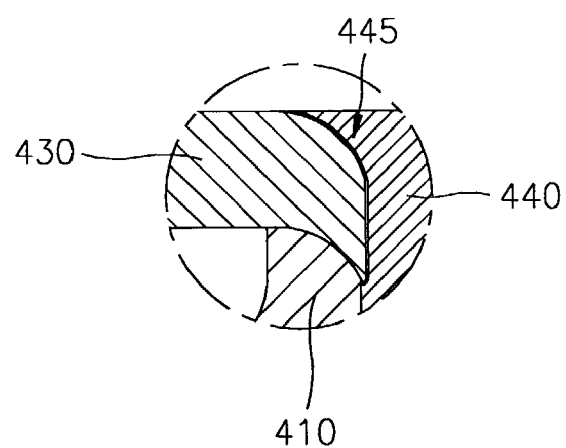
FIG. 12 is a partially enlarged cross-sectional view of the part "C" in FIG. 11.

FIG. 11 is a cross-sectional view of a substrate floating apparatus according to a third embodiment of the present invention and FIG. 12 is a partially enlarged cross-sectional view of the part "C" in FIG. 11.

Referring to FIG. 11, the substrate floating apparatus 400 according to the third embodiment of the present invention includes a body 410 into which floating fluid is supplied and which stores the floating fluid and a floating board 430 placed on the top of the body 410, through which the floating fluid is sprayed to float a glass substrate by a predetermined height. In addition, the substrate floating apparatus 400 includes a cover 440 having a supporting projection 445 that supports the floating board 430 while pressing and bending the periphery of the floating board 430 toward the body 410 and a connecting member 450 for connecting the cover 440 with the body 410.

The floating board 430 does not include the groove described in the above embodiment, but is fixed such that the periphery of the floating board 430 is pressed and bent by the supporting projection 445 of the cover 440. The floating board 430 is flexible since the floating board includes a plurality of holes through which the floating fluid is sprayed. It is desirable that the surface of the supporting projection 445 and the major surface of the floating board are in the same plane. Further, the sides of the floating board 430 may contact the sides of the cover 440.

The body 410 and the connecting member 450 may have the same structures with those in the first embodiment.

According to the third embodiment, since the floating board 430 is fixed to the cover 440 while the periphery thereof is pressed and bent by the supporting projection 445 of the cover 440 and the floating board 430 and the cover 440 is fixed to the body 410 via the connecting member 410, it is possible to fix the floating board 430 to the body 410 without using adhesives.

Embodiment 4

Figure 13:
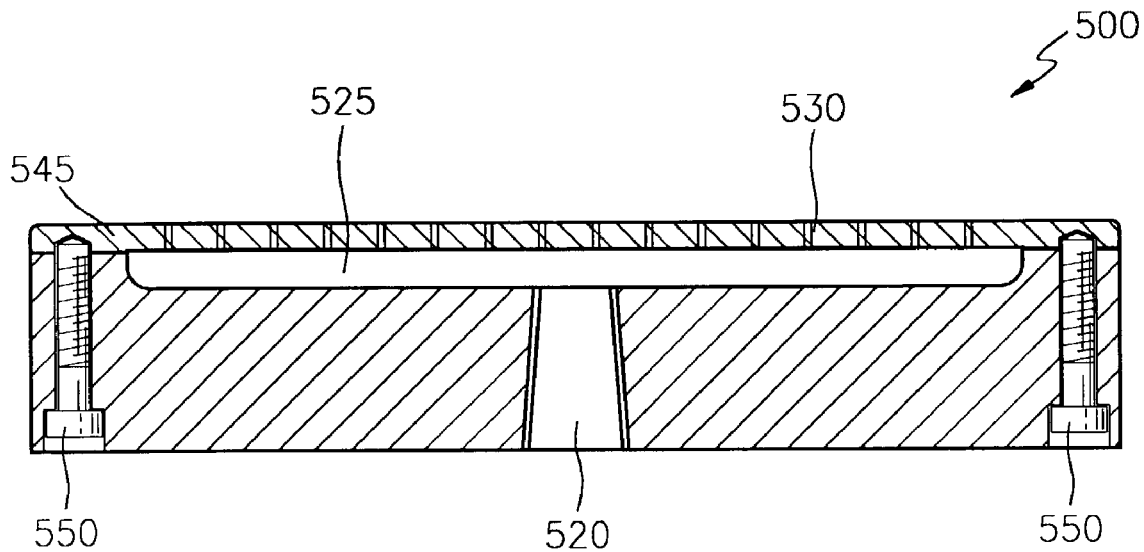
FIG. 13 is a cross-sectional view of a substrate floating apparatus according to a fourth embodiment of the present invention.

FIG. 13 is a cross-sectional view of a substrate floating apparatus according to a fourth embodiment of the present invention.

Referring to FIG. 13, the substrate floating apparatus 500 according to the fourth embodiment of the present invention includes a body 510 into which floating fluid is supplied and which stores the floating fluid, a floating board 530 placed on the top of the body 510, through which the floating fluid is sprayed to float a glass substrate by a predetermined height, and a connecting member 550 for directly connecting the floating board 530 with the body 510.

The body 510 includes a fluid inlet 515 through which the floating fluid is supplied, and a tank 520 for storing the floating fluid supplied through the fluid inlet 515.

The floating board 530 is placed on the top of the body 410. Preferably, the floating board 430 has the same width with the body 410. Further, the width of the tank 520 is smaller than the floating board 530 so that the tank 520 is spaced from the sides of the body 510.

The connecting member 550, such as a bolt, mechanically connects the floating board 530 and the body 510. Here, the connecting member 550 is provided at the space between the sides of the body 510 and the tank 520.

According to the fourth embodiment of the present invention, since the body 510 and the floating board 530 are directly connected using the connecting member 550, it is possible to prevent the separation of the floating board 530 from the body 510 despite that high temperature and high pressure processes are performed for a long time.

Now, a method of manufacturing LCD devices using a substrate floating apparatus according to another embodiment of the present invention will be described.

Figure 14:
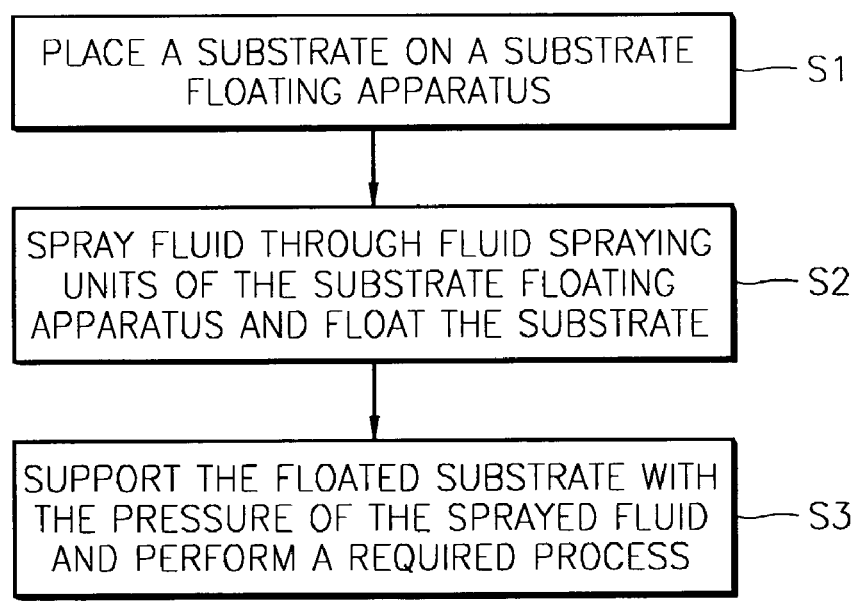
FIG. 14 is a flowchart of a method of manufacturing LCD devices according to a preferred embodiment of the present invention.
Figure 15:
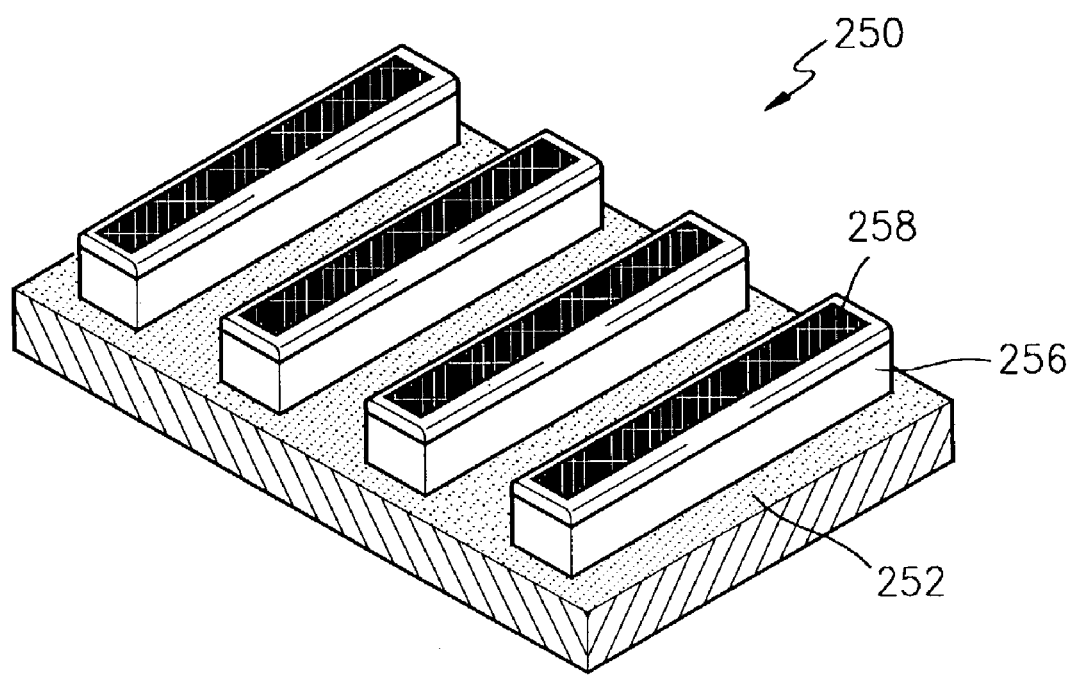
FIG. 15 is a perspective view of a substrate floating apparatus according to another embodiment of the present invention.
Figure 16:
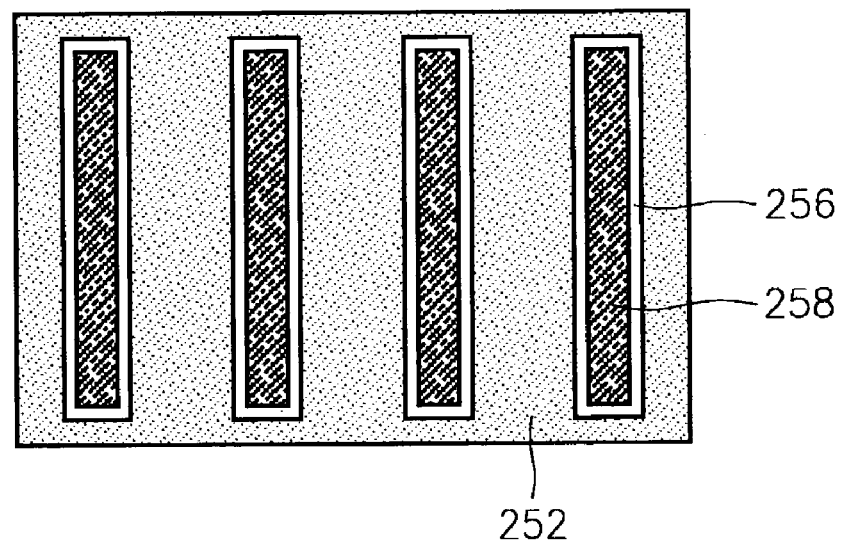
FIG. 16 is a plane view of FIG. 15.
Figure 17:
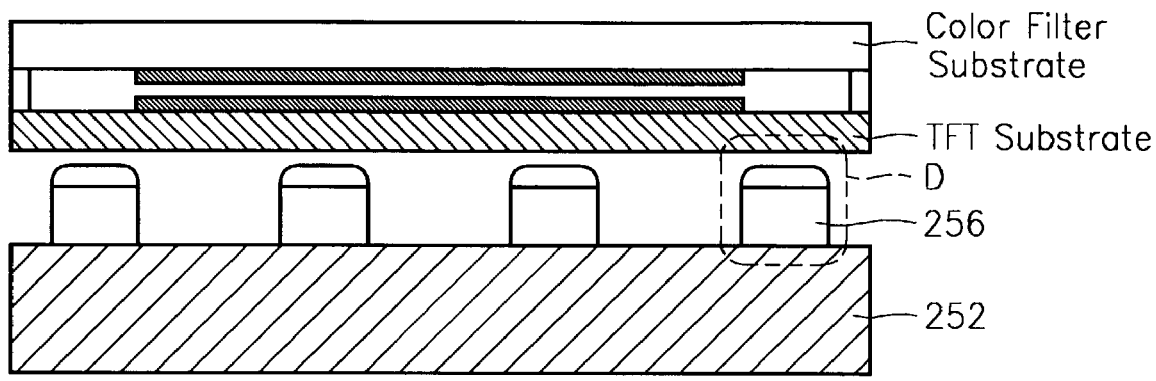
FIG. 17 is a front view of FIG. 15, where an assembly of TFT and CF substrates together with the substrate supporting apparatus are shown.
Figure 18:
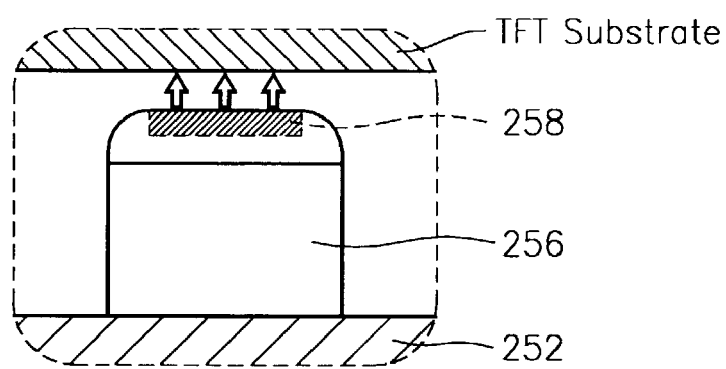
FIG. 18 is a partially enlarged cross-sectional view of the part "D" in FIG. 17.

FIG. 14 is a flowchart for explaining a unit process of a method of manufacturing LCD devices according to a preferred embodiment of the present invention. FIG. 15 is a perspective view of a substrate floating apparatus according to another embodiment of the present invention and FIG. 16 is a plane view of FIG. 15. Further, FIG. 17 is a front view of FIG. 15 together with an assembly of TFT and CF substrates and FIG. 18 is a partially enlarged cross-sectional view of the part "D" in FIG. 17.

Referring to FIGS. 14 and 15 through 18, a substrate, which is subject to a certain process, is placed on the top of the substrate floating apparatus 250 (Step S1). The substrate can be a TFT substrate, a CF substrate, or an assembly of the TFT and the CF substrates. The substrate floating apparatus includes a platform 252 and a fluid spraying unit 256 attached to the platform 252. While only one fluid spraying unit 256 can be used if the size thereof is sufficient to spray enough fluid to float the substrate, it is preferable to use a plurality of fluid spraying units 256 in consideration of the pressure of the sprayed fluid, the weight of the substrate, etc. In the case of using a plurality of fluid spraying units 256, they are place at constant intervals so that uniform pressure can be applied to the substrate. Conventionally, the substrate is likely to be scratched because the substrate is supported by and contacts a plurality of thin and long supporting members. However, according to the present invention, since the substrate is supported using the pressure of the sprayed fluid and there are no mechanical contacts, the scratch problem can be solved. Further, even when the space between the top of the fluid spraying unit 256 and the substrate is narrowed due the pressure from the above, the top of the fluid spraying unit 256 and substrate are not contacting with each other since the pressure increases in inverse proportion to the narrowed space.

Sometimes, positions of the substrates should be adjusted during the course of the process. For example, in a case of assembling a TFT substrate and a CF substrate, the adjustment in positions of the substrates is required to accurately align the positions marked on both substrates and correctly assemble both substrates. In the case of using the conventional supporting members, it is not easy to adjust the positions of the substrates due to the scratch problem, etc. However, according to the present invention, since the substrates are not directly contacting hard materials, it is easy to adjust the positions of the substrates without the scratch problem.

The substrate floating apparatus 250 in this embodiment can be any type of substrate floating apparatuses 200, 300, 400, and 500 according to the first to fourth embodiments described above. That is, the substrate floating apparatuses 200, 300, 400, and 500 described above can be used not only for conveying a substrate but also for supporting the substrate like the substrate floating apparatus 250.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. An apparatus for floating a substrate by a predetermined height, comprising:
    a body for storing a floating fluid supplied thereinto;
    a floating board, placed on the body, having:
        a plurality of openings for spraying the floating fluid to float the substrate to the predetermined height, and
        an outer periphery having a groove;
    a cover, coplanar with a top surface of the floating board and enclosing the outer periphery of the floating board, having a protrusion fixedly inserted into the groove of the floating board; and
    a connecting member, provided at one or more positions of the periphery of the body, to connect the body to the cover.

2. An apparatus for floating a substrate by a predetermined height, comprising:
    a body for storing floating fluid supplied thereinto;
    a floating board, placed on the body, having:
        a plurality of openings for spraying the floating fluid to float the substrate to the predetermined height, and
        an outer periphery having a groove;
    a cover, coplanar with a top surface of the floating board and enclosing the outer periphery of the floating board, having a supporting projection for supporting the floating board while pressing and bending the periphery of the floating board; and
    a connecting members, provided at one or more positions of the periphery of the body, to connect the body to the cover.

* * * * *